United States Patent [19]

Gunti

[11] 4,399,908
[45] Aug. 23, 1983

[54] STRUCTURAL ELEMENT

[75] Inventor: Rolf Gunti, Laufen, Switzerland

[73] Assignee: Masyc AG, Munchenstein, Switzerland

[21] Appl. No.: 897,706

[22] Filed: Apr. 19, 1978

[30] Foreign Application Priority Data

Apr. 19, 1977 [CH] Switzerland ..............................4839

[51] Int. Cl.³ ........................................... B65G 13/06
[52] U.S. Cl. .................................... 198/789; 198/860
[58] Field of Search .............. 198/780, 789, 790, 860, 198/861, 781; 193/35 R

[56] References Cited

U.S. PATENT DOCUMENTS

| | | | |
|---|---|---|---|
| 3,035,683 | 5/1962 | Bishop | 198/860 |
| 3,605,994 | 9/1971 | Parlette | 198/860 |
| 3,669,244 | 6/1972 | Pagdin et al. | 198/860 |
| 3,890,755 | 6/1975 | Specht | 198/780 |
| 4,056,180 | 11/1977 | Gunti | 198/860 |
| 4,063,636 | 12/1977 | Stein | 198/789 |
| 4,108,303 | 8/1978 | Vogt et al. | 198/789 |

Primary Examiner—Joseph E. Valenza
Attorney, Agent, or Firm—Hedman, Casella, Gibson, Costigan and Hoare

[57] ABSTRACT

Structural elements are disclosed for assembly into supporting frames for conveyors and which include elongate beams of constant, uniform generally sigma-shaped cross section but having one arm substantially shorter than the other. Elements for use in connecting such means and mounting other members thereon are disclosed, including chain guides which are adapted for fitting within the sigma section beams and are adapted to enclose corresponding chain sprockets.

8 Claims, 11 Drawing Figures

STRUCTURAL ELEMENT

FIELD OF THE INVENTION

The invention relates to structural elements which can be used in the construction of frames such as support frames suitable for conveying devices such as roller tables, pass-through shelving and belt conveyor systems.

The invention also relates to a set of such structural elements adapted to be fitted together in co-operation with each other, and to conveying devices incorporating such structural elements.

The invention also relates to a chain guide element for a chain driven apparatus and to an apparatus, such as a conveyor, incorporating such chain guide elements.

BACKGROUND OF THE INVENTION

A high degree of adaptability and facilities for rearrangement with a low expenditure in terms of labour and material is desirable in the construction of support frames for roller tables, continuous pass-through shelving and belt conveyor systems. Such adaptability and variability of a set of structural elements suited to this end can be achieved only with difficulty if the support frames are to be suitable for conveying heavy goods, more particularly when each item of conveyed goods has a weight of the order of tonnes.

SUMMARY OF THE INVENTION

It is one object of this invention to construct a set of structural elements of the kind described hereinbefore so that combined with a high resistance to bending and torsion and in conjunction with few individual components which can be produced at low cost it is possible to obtain a wide variety in the construction of support frames so that practically any structural shape can be easily and simply produced and can also subsequently be changed with a low expenditure in terms of labour.

According to one aspect of the invention there is provided a set of structural elements for producing variable support frames, more particularly those suitable for conveying devices such as roller tables, pass-through shelving and belt conveyor systems and are also suitable for conveying heavy goods, with sectional bars which can be detachably connected by means of bolts, screws or shafts, which are provided with a middle web member having openings at regular intervals and adjoined on both sides in the outward direction by sloping web members, bent at a defined angle, the ends of each of which merge with a connecting member which is parallel with the middle web member and is associated with U-section flanges which face each other, characterised in that the width of the U-web member of only one of the two U-section flanges together with the width of the middle web member is dimensioned in dependence on the maximum torsion and bending load values for the sectional bars while the second U-section flange is situated with the outside of its free member in the region of the plane containing the inwardly oriented surface of the middle web member.

In one preferred embodiment of the invention it is arranged that the width of the U-web part associated with the first U-section flange is equal to or approximately equal to the width of the middle web member. For particularly heavy loadings it is however advantageous that the U-web member of the first U-section flange is broader than the middle web member.

Advantageously, identically constructed sectional bars can be detachably connected by their abutting end faces by means of a butt joint connecting member. To this end it is advantageous that the butt joint connecting member is provided with a middle web member with openings which can be aligned with the openings of the sectional bars and adjoining on both sides in the outward direction on sloping web members which are bent at a defined angle which bears supportingly on the sloping web parts of U-section bars which are connected to the middle web members when the middle web member of the butt joint connecting member bears on the middle web members.

The defined angle enclosed by the principal planes of the middle web member and of the sloping web members is advantageously between 30° and 60°.

The middle web members advantageously have two rows of openings.

Furthermore, in the preferred embodiment of the invention support members are provided each of which comprises a mounting flange with a row of mounting openings which can be aligned with the openings in the sectional bars, a sloping web member which is bent at the defined angle and a connecting flange with a row of connecting openings that extend at right angles to the connecting line of the mounting openings and on whose side which is distal from the mounting flange there is provided an arcuate aperture whose curvature radius is equal to the distance thereof from a preselected connecting opening and the connecting flange, the sloping web member and part of the connecting flange bear fittingly on the sectional bar after alignment of the mounting openings with the openings of the said sectional bar.

It is advantageous to arrange that support brackets with two angle plates disposed at right angles are provided, of which each angle plate has a slot extending at right angles to each other angle plate and that at oppositely disposed free edges each angle plate has slots which are open to said free edges and are disposed at a defined distance from the plate connecting line parallel thereto.

Finally, in the preferred embodiment of the invention U-sections are provided which function as chain guide members and can be mounted by means of their U-member on the outside of the broader U-web member associated with the sectional bars.

An important advantage of the first-mentioned aspect of the invention is due to the fact that it provides sectional bars with a particularly high resistance to bending and torsion but the set of structural elements nevertheless ensures a high degree of variability in order to satisfy the most diverse conditions relating to support frames. These advantages are disclosed clearly by the description of the exemplified embodiments.

In a particularly advantageous embodiment of the invention which can be generally employed for a set of structural elements suitable for producing variable support frames for conveying devices with pulleys driven by chain, having sectional bars for supporting the driven pulleys, chain guides elements are provided of which each together with a pulley, driven by a chain, can be inserted into the sectional bars on the side of the driving pinion of said pulley and each element has a guide rail which maintains the chain in engagement with the driving pinion.

Furthermore, according to another aspect of the invention, which need not be used in combination with the improved bar section according to the first-mentioned aspect, but may be used separately, there is provided a beam for use in making support frames for conveyors, the beam being an integral member of uniform cross section and comprising a plurality of longitudinally extending walls constituting web members and including a middle web member having holes at regular intervals, two sloping web members extending from said middle web member, two co-planar first side walls extending away from each other from respective said sloping web members, said sloping web members diverging from each other on one side of said middle web and said middle web being parallel with and spaced from the common plane of said first side walls in a first direction, the beam further comprising two bottom walls extending with at least a component in said first direction from respective said first side walls, and two second walls each extending from a respective said bottom wall in the direction of the opposite said bottom wall whereby each said bottom wall defines, together with the respective first and second walls, a respective channel the open side of which faces towards the open side of the other said channel, the width of one of said bottom walls, one of said second side walls having its face which faces in said one direction substantially co-planar with the corresponding face of the middle web, and the width of the bottom wall from which the other of said second side walls extends together with the width of the middle web member being dimensioned in dependence on the maximum torsion and bending load values for the beam.

Advantageously the arrangement is such that each chain guide element is constructed in the form of an angle member with angle plates disposed at right angles to each other, of which one angle plate has an opening and two anchor cams which are laterally offset in the sectional bars at the distance of the openings and can be inserted therein with a register fit and the other angle plate supports the guide rail which is disposed parallel with the connecting line between the anchor cams, and it is advantageous that the distance between the opening and the anchor cams in one angle plate on the one hand and the outside of the other angle plate on the other hand is equal to the distance between one row of openings in the sectional bars on the one hand and the inside of the broader U-web member on the other hand.

One further embodiment of the invention is arranged so that the broader U-web member of the sectional bars has a width which is such that it extends over the driving pinion of an inserted driven pulley and the chain and the free U-member leaves sufficient space for the insertion of the angle plate which is associated with one chain guide element and supports the guide rail, and it is advantageous that the width of the free member adjoining the broader U-web member of the sectional bars is such that it protectingly extends over the teeth of the driving pinion of an inserted driven pulley.

One particularly advantageous embodiment is arranged so that each chain guide element comprises two oppositely disposed guard caps which coveringly surround the driving pinion of an inserted driven pulley, and then the guard caps are disposed on the angle plate which is provided with the opening and anchor cams and extend to the pulley beyond the driving pinion and closely surround the greater part of the circumference thereof, and advantageously that the guard caps extend into the region of a broadening annular shoulder of the pulley.

Advantageously the invention is arranged so that the guard caps terminate at a distance from the inside of the angle plate which supports the guide rail, which said distance corresponds to the height of the driving chain, and it is advantageous that the edge of the guard caps oriented towards the guide rail is constructed with bent web members which are oriented towards each other and extend under the chain parallel therewith closely into the region of the circumference of the driving pinion.

It is also advantageous that the guard caps have side members set at an angle towards the interior pointing to the circumference of the driving pinion on the side which is distal from the guide rail, and it is advantageous that on the edge of the side members which is distal from the guide rail the guard caps are constructed with bent web members which are oriented towards each other and extend above the returning part of the chain parallel therewith directly into the region of the circumference of the driving pinion. Finally, it is advantageous that the guard caps are of L-shaped construction in side view and one end of an L-web is disposed on the angle plate while the other L-web extends away from the guide rail.

It is a particular advantage of the chain guide element according to the invention that in conjunction with a simple construction which ensures inexpensive manufacturing it can be inserted without any additional steps together with a driven pulley into the sectional bars of a support frame and nevertheless ensure reliable engagement between the driving pinion and the driving chain while screening the driving pinion and the driving chain and thus reliably protecting operating personnel against injury. Other advantages of the individual embodiments are disclosed in the description of the exemplified embodiments.

DESCRIPTION WITH REFERENCE TO THE DRAWINGS

Figures 1, 2:
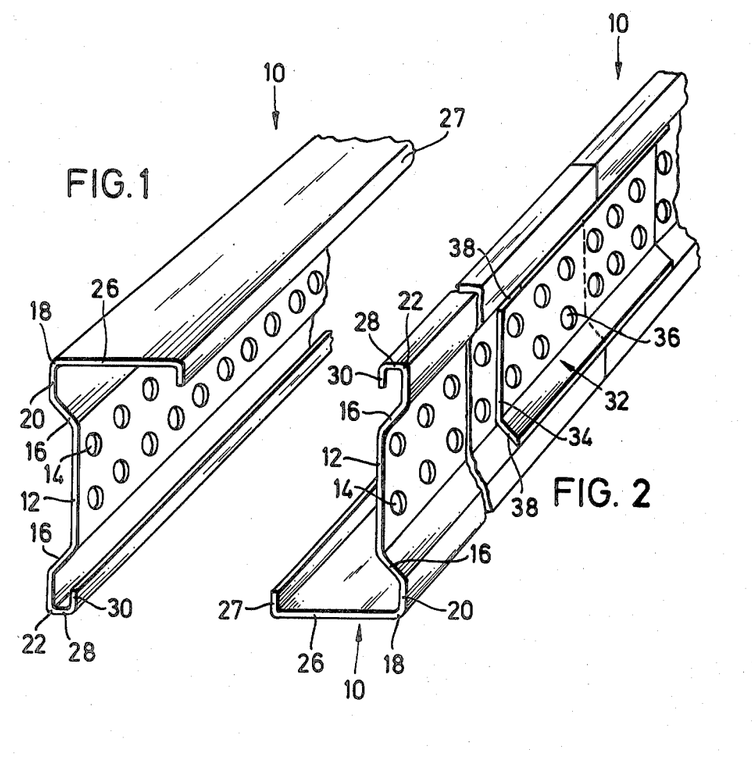
FIG. 1 is a perspective view of part of a sectional bar from its inside, the U-flange with the broader U-web facing upwardly.
FIG. 2 is a perspective view of part of two sectional bars whose end faces abut against each other, with an inserted but not yet screw-mounted butt joint connecting member.

According to the drawing sectional bars 10 of identical shape, and in particular of constant, uniform cross-sectional size and shape throughout their length (neglecting holes formed therein), of which each bar has a middle web member 12 which is formed with two parallel rows of openings 14 disposed at regular distances.

A sloping web member 16 adjoins each of the two oppositely situated longitudinal sides of the middle web member 12 and is outwardly bent at a defined angle which amounts to 45° in the illustrated embodiment.

A U-section flange 18 is joined by means of a connecting member 20 to the end of a sloping web member 16 and a second U-section flange 22 is joined via a connecting member 24 to the end of the other sloping web member 16. Both U-section flanges 18 and 20 face each other with their open sides.

The U-section flanges 18, 22 are formed by respective formation defining respective oppositely directed channels, and comprising, in the case of the formation forming flange 18, a bottom wall or U-web member 26, a first side wall comprising one arm of the respective U in combination with member 20, and a second side wall 27, and, in the case of the formation forming flange 22, a bottom wall or U-web member 28, a first side wall comprising one arm of the respective U in combination with member 24, and a second side wall 30.

The width of the U-web member 26 of the U-section flange 18 is made sufficiently large so that in conjunction with the middle web member 12 it is able to absorb the greater part of the bending and torsion loads which stress the sectional bar. The U-web member 26 of the specific embodiment has the same width as the middle web member 12.

The U-section flange 22 has a U-web member 28 of a width which is so narrow that the outside of its free member 30 is situated in the same plane as the inwardly oriented surface of the middle web member 12, i.e. the surface which faces in the direction in which the webs 26, 28 extend from their associated said first side walls.

The sectional bars 10 of identical shape are joined to each other by being placed against each other with their end faces in abutment after which a butt joint connecting member 32 is inserted so that it overlaps the adjoining end portions of the two bars 10. A butt connecting member 32 of this kind is inserted in FIG. 2 but is not shown bolted to the bars 10 by bolts passed through the aligned openings in the webs 12 and 34 as it would be in the completed frame. Each butt connecting member 32 is provided with a middle web member 34 which has openings 36 that can be aligned with the openings 14 of the middle web member 12 associated with the sectional bars 10.

On each side each butt connecting member 32 is also provided on each side with a sloping web member 38 which is bent at the predefined angle, in the illustrated embodiments at 45° from the middle web member 34.

The defined angle is the angle included by the principal plane of the middle web member and the principal planes of the sloping web members.

The width of the middle web members 34 associated with the butt connecting members 32 are dimensioned so that when their middle web member 34 bears on the middle web members 12 of two abutting U-section bars 10 the sloping web members 38 bear on the sloping web members 16 of the U-section bars in a supporting manner.

According to FIGS. 3 to 6 the set of structural elements also comprises the support members 40 and the support bracket 42.

Figures 3, 4:
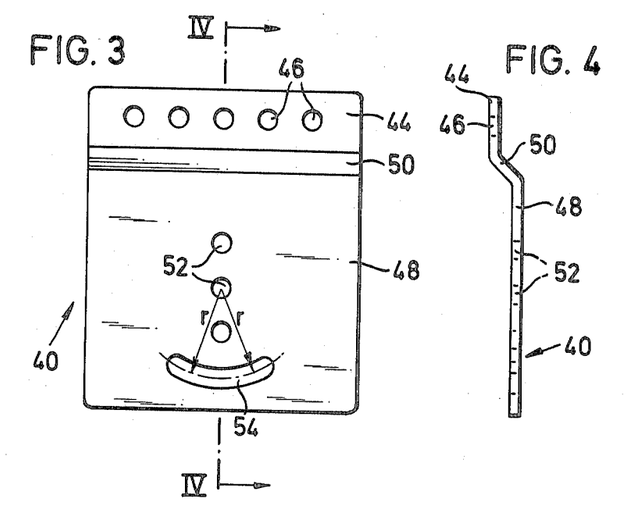
FIG. 3 is a front view of a support member.
FIG. 4 is a sectional view along the line IV—IV of FIG. 3.

Each support member 40 comprises a mounting flange 44 in which a row of mounting openings 46 are formed which can be aligned with the openings 14 of the sectional bars 10.

The support member 40 is also provided with a connecting flange 48 which is arranged parallel with the mounting flange 46 and is joined thereto by means of a sloping web member 50 which is bent at the defined angle relative to the mounting flange 44 and the connecting flange 48, the angle being 45° in the illustrated embodiment.

A row of connecting openings 52 is formed in the connecting flange 48 and extends at right angles to the row of mounting openings 46 in the mountng flange 44.

An arcuate opening 54 is also provided in the connecting flange 48 at the end of the row of connecting openings 52 distal from the mounting flange 44, and the curvature radius r in the illustrated embodiment is equal to the distance from the middle connecting opening 52 of the row of connecting openings.

The cross-section shape of the support member 40 (as shown in FIG. 4) is so devised that when its mounting openings 46 are in alignment with the openings 14 of a sectional bar 10 its mounting flange 44 as well as its sloping web member 55 and the adjoining part of the connecting flange 48 bear fittingly on the associated parts of the sectional bars 10.

Figure 5:
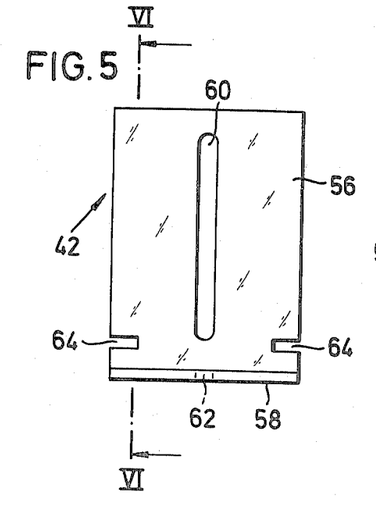
FIG. 5 is a front view of the inside of a support bracket.
Figure 6:
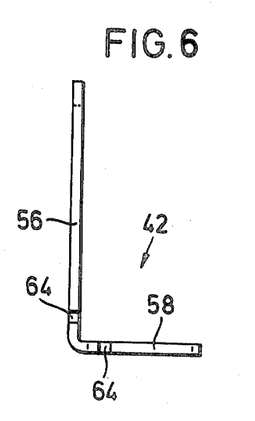
FIG. 6 is a sectional view along the line VI—VI of FIG. 5.

The support bracket 42 is provided with two angle plates situated at right angles with respect to each other and each plate has a slot 60 or 62 which extends at right angles to the line of the junction with the other angle plate. Each angle plate 56 and 58 is also provided at its oppositely disposed free edges with a slot 64 which is open with respect to the said edge and is situated at a defined distance from the line connecting both angle plates. The open slots 64 enable the support bracket 42 to be connected to tubular bars which have web members adapted to engage in the open slots 64 to enable a particular firm connection to be established.

Figure 7:
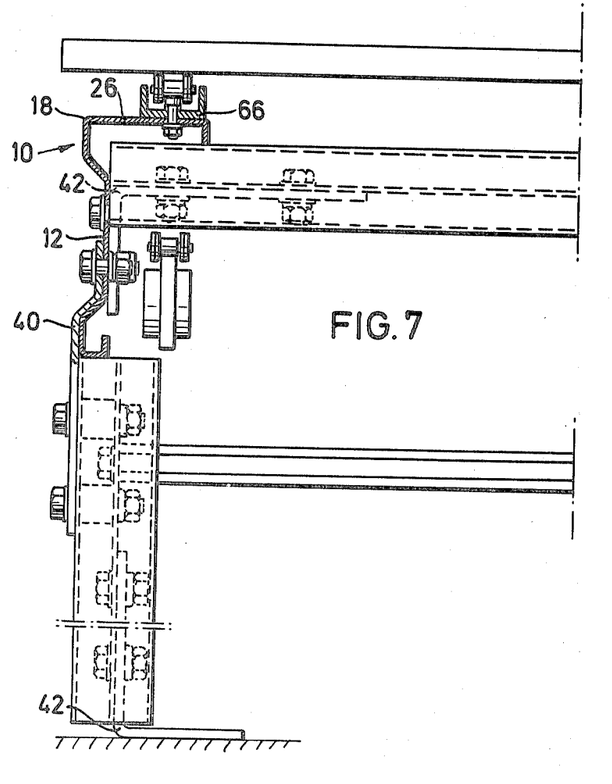
FIG. 7 is a partial sectional view of a chain conveyor.

The set of structural elements according to FIG. 7 also has U-sections 66 (i.e. elongate U-section members) which function as chain guide members and are mounted by means of their U-web members (i.e. their prts providing the bottoms of the respective 'U's') on the outside of the broader U-web member 26 associated with the sectional bars 10. This permits universal use of the sectional bars in a simple manner not only in conjunction with roller tables but also in conjunction with ordinary chain conveyors.

FIG. 7 also illustrates the universal means of using the support members 40 and the support brackets 42.

Figure 9:
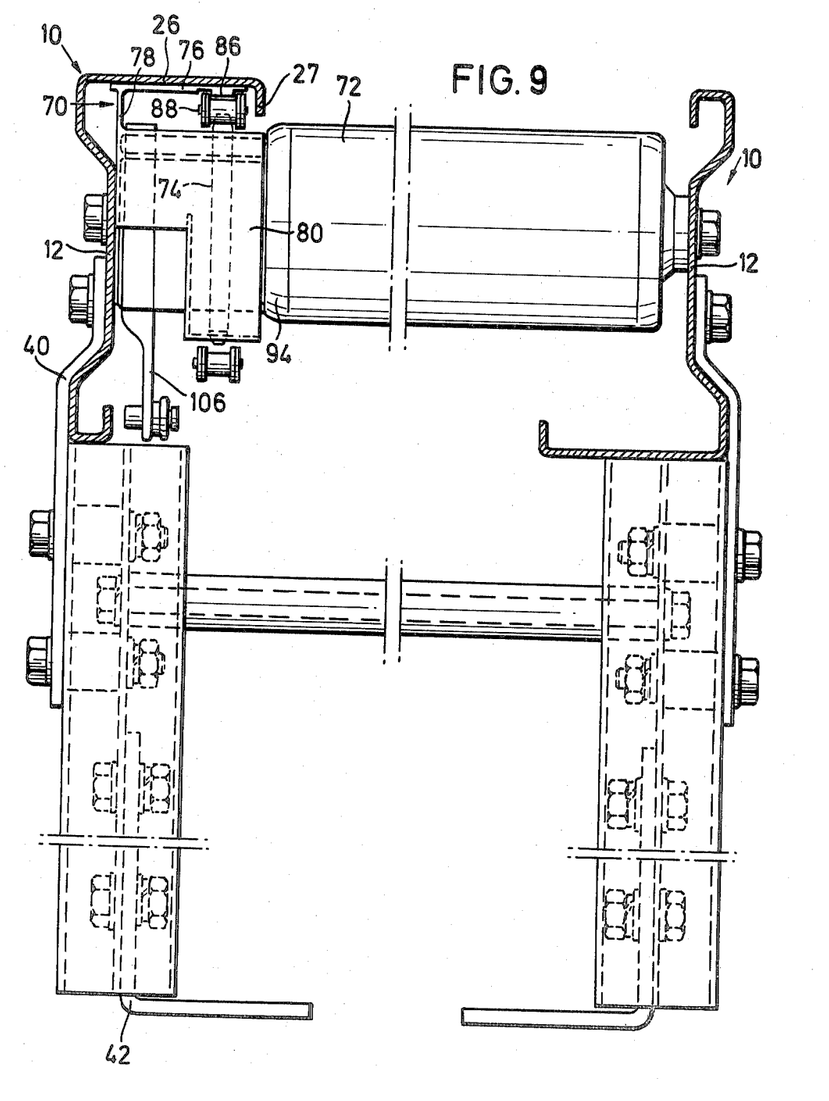
FIG. 9 is a partial sectional view of a roller table, both end portions being shown.
Figure 10:
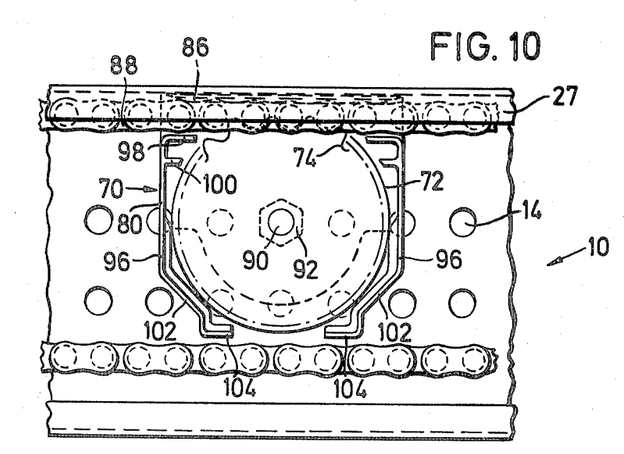
FIG. 10 is a front view of a chain guide element inserted into a sectional bar, other parts of the conveyor being shown diagrammatically.
Figure 11:
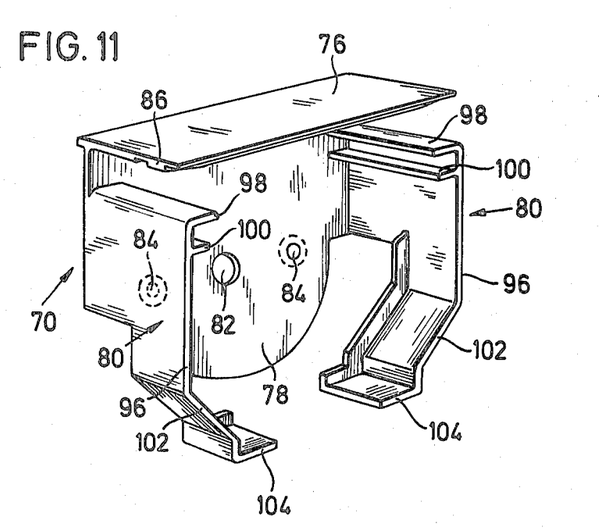
FIG. 11 is a perspective view of the chain guide element according to the invention with guard caps.

FIGS. 9 to 11 show chain guide members 70 which may be used in conjunction with the bars 10 or separately and which members represent an important invention in their own right and are illustrated and described merely by reference to the illustrated sectional bars. The inventive construction and operation of the chain guide members 70 is independent of the shape of the sectional bars which are illustrated herein. The chain guide members 70 can also be effectively utilized in conjunction with sectional bars of other cross-sectional shape.

Each chain guide member 70 together with a chain-driven pulley 72 can be inserted into a sectional bar 10 on the side of the driving pinion 74, associated with said pulley.

The important parts of each chain guide element 70 comprise a retaining bracket containing two angle plates 76 and 78 arranged at right angles to each other and two guard caps 80 which are disposed on one angle plate 78.

One angle plate 78 has a continuous opening 82 and is provided on its outside with two anchoring cams 84. Each anchoring cam 84 is situated at a distance from the opening 82 which said distance corresponds to the distance between the openings 14 in the sectional bars 10. The anchor cams 84 can also be inserted with a register fit into the openings 14 of the sectional bars 10. By virtue of this construction it is possible for each chain guide element 72 to be non-rotationally joined to a sectional bar by means of only a single bolt.

The other angle plate 76 supports a guide rail 86 which points to the space between the angle plates and is arranged parallel with the other angle plate 78.

As shown in FIGS. 9 and 10 the guide rail 86 of each chain guide element 70 maintains the driving chain 88 in constant mesh with the driving pinion 74 which is associated with the chain guide element.

The distance between the opening 82 and the anchor cams 84 in one angle plate 78 on the one hand and the outside, i.e. the top in FIG. 11, of the other angle plate 76 is equal to the distance between the openings 14 of a row of openings, in the illustrated embodiment according to FIGS. 9 and 10 the row of openings nearer the top in the sectional bars 10, and the inside i.e. in the embodiment according to FIGS. 9 and 10 the downwardly oriented side of the broader U-web member 26 on the other hand. Furthermore the broader U-web member 26 of the sectional bars has a width which is such that it extends over the driving pinion 74 of an inserted driven pulley 72 and over the chains and the adjoining free U-member 27 leaves sufficient space for the insertion of the angle plate 76 which is associated with a chain guide element 70 and supports the guide rail 86.

By virtue of the construction described in the preceding paragraph and in conjunction with an uncomplicated embodiment of the chain guide element 70 it is possible for the latter together with the driving pinion 74 of the pulley 72 to be non-rotationally and non-slidably inserted into a sectional bar 10. It is merely necessary to insert the screw-threaded shaft 90 of the pulley 72 through the opening 82 in the angle plate 78 and through the opening 14 aligned therewith and associated with the sectional bar 10 and for a nut 92 to be mounted on the other side.

According to FIGS. 9 and 10 the free member 27 of the U-section flange 26 is of sufficient width to protectingly extend over the teeth of the driving pinion 74.

The two oppositely disposed guard caps 80 form an important part of the chain guide element 70 and according to FIGS. 9 and 10 coveringly surround the driving pinion 74 of a driven pulley 72.

The guard caps 80 are disposed on the anchor plate 78 which is provided with the opening 82 and the anchor cam 84 and extend from there to the inserted pulley 72 beyond the driving pinion 74 into the region of a broadening annular shoulder 94 associated with the pulley 72. The guard caps 80 also extend over the greater part of the circumference of the driving pinion 74 at a short distance therefrom. To this end each guard cap 80 is provided with a side member 96 which extends parallel with the corresponding side member 96 of the other guard cap 80 of the same chain guide element 70 and is disposed approximately at the height of the diameter of the driving pinion 74 which interconnects the two side members 96. The said side members 96 terminate in front of the guide rail 86 and of the inside of the angle plate 76 supporting the latter, namely at a distance which corresponds to the height of the driving chain. Furthermore, on its edge oriented towards the guide rail 86 each side member 96 is provided with a web member 98 which is oriented to the corresponding web member 98 of the oppositely disposed guard cap 80 and extends beneath the driving chain 88 parallel therewith into the immediate region of the circumference of the driving pinion 74. A further web member 100 is disposed at a short distance from the web member 98 on the side thereof distal from the driving chain 88 and parallel therewith and also extends into the immediate region of the circumference of the driving pinion 74. The side member 96 of each guard cap 80 merges on its end distal from the guide rail 86 into a side member 102 which is bent relative to the circumference of the driving pinion 74 and whose angle is selected so that the said side member 102 again extends directly along the circumference of the driving pinion 74. One web member 104 adjoins each bent side member 102 and is oriented to the corresponding side member 104 of the oppositely disposed guard cap 80 and extends above the returning part of the driving chain 88 parallel therewith again into the immediate region of the circumference of the driving pinion 74.

The previously described construction of the guard caps 80 of the chain guide elements 70 in conjunction with the free member 27 of the U-section flange 18 and the annular shoulder 94 of the inserted pulley in a simple manner ensures reliable screening of the driving pinion 74 and of the driving chain 88 which meshes therewith.

According to FIGS. 9 and 11 each guard cap 80 is of L-shaped construction in side view and is disposed with the end of one L-web on the angle plate 78 while the other L-web extends away from the guide rail. By virtue of this construction it is possible for driven pulleys with a clutch and clutch-operating lever 106 to be used in conjunction with such chain guide elements 70 without on the one hand impairing the operation of the levers 106 and without on the other hand weakening the screening function of the guard caps 80.

Figure 8:
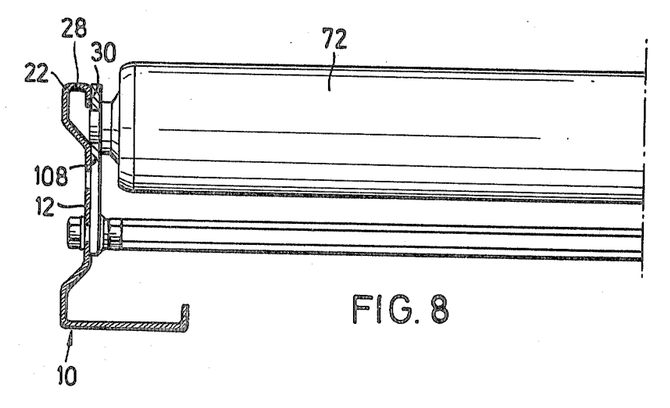
FIG. 8 is a partial sectional view of a roller table.

The special construction of the sectional bars according to FIGS. 1 and 2 permits a large number of combinations to be obtained of which FIGS. 7, 8 and 9 are examples.

In the construction according to FIG. 9 in which a sectional bar is upwardly oriented with the broader U-web member and the oppositely disposed sectional bar is arranged with the broader U-web member in the downward direction to permit optimum utilization of the width of the driven pulley in conjunction with a lateral guide on both sides of the pulleys.

In the construction according to FIG. 8 the pulleys 72 are set even higher by means of bearing plates 108 while the broader U-web member is disposed beneath the pulleys 72. In this way it is possible to obtain a roller table which utilizes the entire width of the pulleys 72 and eliminates lateral limiting means where they are undesired.

FIG. 8 also illustrates that the bearing plates 108 are supported in a simple and optimum manner since the outside of the free member 30 associated with the U-section flange 22 is situated in one plane with the surface of the middle web member 12 which is used for support purposes.

In the embodiment according to FIG. 7 the same sectional bars 10 have been inserted unchanged as supports for a chain conveyor in which the broader U-web member 26 of all sectional bars 10 is oriented in the upward direction and on whose top there is mounted a U-section 66 which is open at the top and sefves as chain guide.

The construction of the sectional bars 10 enables support frames for conveyor systems to be erected more particularly those for transporting heavy goods. The set of structural elements is suitable for the erection of conveyor systems for transporting goods of which each piece of goods has a weight of the order of tonnes. The load-bearing capacity for such heavy goods is ensured although the set of structural elements comprises a few components of simple design with which support frames for conveyor systems with a large number of different characteristics can be erected in a very simple manner.

I claim:

1. A set of structural elements for producing longitudinally extending support frames for conveying devices, said support frames being disposed parallel to the conveying direction and on opposed sides of the conveyor path, said conveying devices including a cylindrical roller having a central spindle and a pinion at one end thereof, said roller being driven by a chain entrained around said pinion, said set of structural elements comprising:

a plurality of detachably connected sectional bars, each said sectional bar including a middle web member (12) having openings (14) at regular intervals therealong, and adjoined on both sides in the outward direction by sloping web members, bent at a defined angle, the ends of which merge with a connecting member (20, 22) which is parallel with the middle web member and is associated with U-section flanges which face each other, with one U-section flange (20) having a broad U-web member (16), the latter together with the middle web member being dimensioned for maximum torsion and bending load values for said sectional bars, and with the other U-section flange (22) having its outside free member (30) situated in the region of the plane containing the inwardly oriented surface of the middle web member; and a chain guide member having first and second angled plate members (78, 76) disposed in perpendicular relationship, said first angled plate member (78) including a central aperture for receiving said central spindle of said roller, said chain guide member further including a pair of guard caps formed integrally with said first angled plate member and projecting perpendicularly outwardly therefrom towards said roller, said guard caps being spaced from said second angled plate member (76) thereby defining a chain receiving channel, said guard caps being configured to extend over and be spaced from a portion of the circumference of the pinion of said roller, and with said second angled plate member further including a guide rail for urging said chain, disposed within said chain receiving channel, into driving engagement with said pinion, and with said first angled plate member further including a pair of anchor cams (84), projecting outwardly therefrom, opposed to said guard caps, said anchor cams being receivable in said openings (14) formed in said middle web member (12) when said guide member is mounted on said sectional bar with said first angled plate member (78) being in face to face contacting relationship with said inner surface of said middle web member (12) and with said second angled plate member (76) being disposed parallel and adjacent to said broad U-web member (26), said broad U-web member thereby shielding said second angled plate member (76), and whereby said anchor cams (84) are operative to prevent the rotation of said chain guide member relative to said sectional bar.

2. The set of structural elements of claim 1, in which the defined angle formed by the principal planes of the middle web member and of the sloping web member amounts to between 30° and 60°.

3. The set of structural elements of claim 1, in which the middle web members have two parallel rows of openings.

4. The set of structural elements of claim 1, in which support members are provided each of which comprises a mounting flange with a row of mounting openings which can be aligned with the openings in the sectional bars, a sloping web member which is bent at the defined angle and a connecting flange with a row of connecting openings that extend at right angles to the connecting line of the mounting openings and on whose side which is distal from the mounting flange there is provided an arcuate aperture whose curvature radius is equal to the distance thereof from a preselected connecting opening and the connecting flange, the sloping web member and part of the connecting flange bear fittingly on the sectional bar after alignment of the mounting openings with the openings of the said sectional bar.

5. The set of structural elements of claim 1, in which support brackets with two angle plates disposed at right angles are provided, of which each angle plate has a slot extending at right angles to each other angle plate and that at oppositely disposed free edges each angle plate has slots which are open to said free edges and are disposed at a defined distance from the plate connecting line parallel thereto.

6. A set of structural elements as recited in claim 1 wherein the detachable connection between said sectional bars includes a butt joint connecting member having a middle web member with openings which can be aligned with the openings in said sectional bars and adjoined on both sides in the outward direction on said sloping web members which are bent at a defined angle thereby bearing supportingly on the sloping web parts of said U-section flanges which are connected to the middle web members when the middle web members of the butt joint connecting member bears on the middle web members.

7. A set of structural elements as recited in claim 1 in which the distance between said anchor cams and said central spindle receiving aperture of said chain guide member is equal to the distance between said openings on said middle web members of said sectional bars.

8. A set of structural elements as recited in claim 7 wherein said central spindle receiving aperture is disposed between said anchor cams of said chain guide member.

* * * * *